United States Patent
Dahman et al.

(10) Patent No.: US 6,253,294 B1
(45) Date of Patent: Jun. 26, 2001

(54) SHARED DEVICE ACCESS PROTECTION

(75) Inventors: Kirby Grant Dahman, Tucson, AZ (US); James Jules Brogan, Jr., deceased, late of Pomerene; by Irene Brogan, Pomerene, both of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/252,015

(22) Filed: Feb. 18, 1999

(51) Int. Cl.$^7$ ........................................... G06F 12/00
(52) U.S. Cl. ........................ 711/151; 711/152; 711/158
(58) Field of Search .................... 711/151, 152, 711/158, 163; 710/90, 240

(56) References Cited

U.S. PATENT DOCUMENTS

| | | | |
|---|---|---|---|
| Re. 33,328 | * 9/1990 | Director | 711/652 |
| 5,317,717 | * 5/1994 | Cutler et al. | 711/163 |
| 5,809,546 | * 9/1998 | Greenstein et al. | 711/164 |
| 6,032,217 | * 2/2000 | Arnott | 710/200 |
| 6,041,394 | * 3/2000 | Halligan et al. | 711/166 |
| 6,073,218 | * 6/2000 | DeKoning et al. | 711/150 |

* cited by examiner

*Primary Examiner*—Matthew Kim
*Assistant Examiner*—C. P. Chace
(74) *Attorney, Agent, or Firm*—John H. Holcombe; Robert M. Sullivan

(57) ABSTRACT

A method, system, and computer program product for protecting data of a shared access data storage system from being overwritten, where the data storage system includes a device which is shared by separate hosts over at least two logically or physically distinct communication paths. An overwrite protection facility operates the data storage system controller processor independently of the hosts to automatically protect the device upon the occurrence of a write command for the device. The protection allows only the communication path issuing the write command, and communication paths in the same group as the issuing communication path, to issue commands resulting in movement of the media on the device. Commands not resulting in movement of the media are allowed from any communication path. The protection continues until specifically released by a "MEDIA REMOVAL" command. The protection, in one embodiment, is by means of a prime protected attribute for the device-communication path pair. The protection permits normal initialization activities of attached hosts to occur without impediment, but blocks actions which could result in unintentional data overwrites (and data loss) in shared environments.

30 Claims, 3 Drawing Sheets

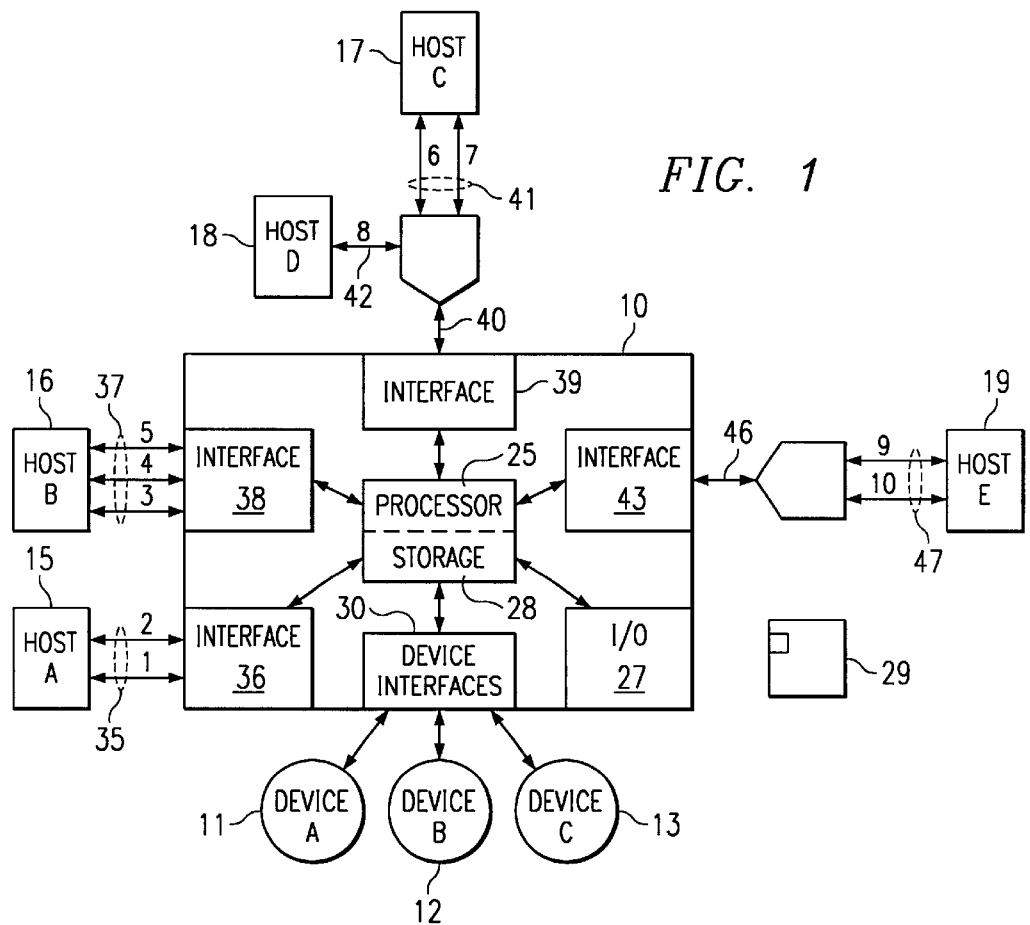
FIG. 1
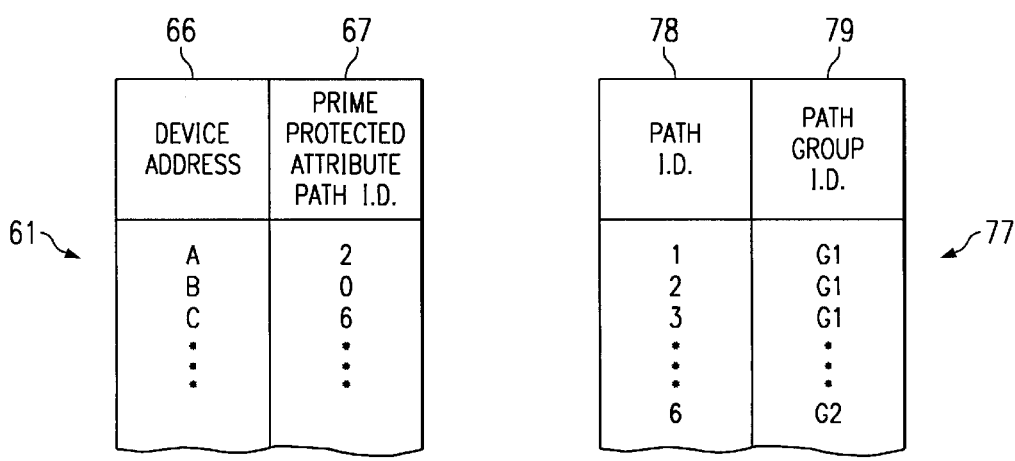
FIG. 3
FIG. 4

SHARED DEVICE ACCESS PROTECTION

TECHNICAL FIELD

This invention relates to data storage devices which do not commonly employ command chains with embedded orientation, such as tape data storage devices, and, more particularly, in an environment where a device is shared between multiple communication paths, to the protection of data recorded on such devices from being overwritten.

BACKGROUND OF THE INVENTION

Devices that do not require self-orienting command chains comprise those devices whose media are not continually moving, and which typically come to a stop after completion of a read or a write operation. Self-orienting devices are those whose orientation is constantly changing, as in constantly rotating magnetic disk drives, and which require continuing sets of identifiers, such as the track, sector, etc., identifiers. Examples of devices which are not self-orienting include magnetic tape drives and optical tape drives.

For non-self-orienting devices, the assumption is made that, following each read or write command, the device is logically positioned to access the next record. This assumption is correct if the device is coupled to a single host, or to a single host at a time. Additionally, such devices typically employ removable media. Commonly, the host software verfies that the correct media is loaded by rewinding the media to read the volume identifier at the BOT (Beginning of Tape) and optionally rewinds again to the BOT. Thus, in every instance, a single host is aware of the location of the data storage media in the drive.

Typically, a static device configuration process is employed for every control program for each I/O subsystem. The configuration process defines what devices are associated with specific I/O channels or communication paths. These devices are assigned at I/O configuration generation or hardware configuration definition, and may not all be present at any one time. For example, a device may be temporarily off-line for updating or servicing.

No device may be permanently assigned to any one host or its communication path since to do so would detract from the I/O subsystem availability, for example, by leaving one device idle when not needed by one host, while another host is using its available device and requires the use of another. Thus, the typical I/O configuration couples each host to as many of the data storage devices as possible.

A difficulty arises when the device is shared between multiple hosts coupled to the device controller over multiple communication paths. Should one device controller complete a command for one host, and then a command from a different host causes movement of the media on the device (such as to read the volume identifier), the first host, in most cases, is unaware of the movement of the media and may continue with write operations, for example, at the present position of the tape, which is different than the position where the first host left it. The first host is likely to thus overwrite any data at the actual present logical position of the media. Thus, the specific data that was overwritten is at a location unknown to the host and therefore the data that was overwritten is also unknown, and may be irretrievable from any other source.

As the result, protocols have been developed to attempt to assure that only one host can move the media at one time, thus providing a one-host-at-a-time environment. Such protocols include changing the active host assignments by means of dynamic device partitioning. In systems of the IBM System 390 type, the host/device assignment mechanism is called "VARY ONLINE". The protection against override may be at the hardware level, using the "ASSIGN" and "UNASSIGN" process for IBM System 390, and for SCSI systems, "RESERVE and RELEASE". In one example (Job Entry Subsystem 2), the sharing of devices is through a simple "VARY", and the protection is managed through the assign process at the hardware level, requiring operator host console intervention. However, a risk is that a sloppy operator can inadvertently override the protection. In another example (JES 3 or MULTI-IMAGE MANAGER of COMPUTER ASSOCIATES), the protection is at the software level through coordination between the hosts via a common communication mechanism (shared disk or other common link). However a software failure or certain operator failures have been found to result in inadvertent overwrite.

An example of an operator failure may result from use of default passwords to bypass hardware protections. Another system, not part of the coordinating hosts in the first system, may physically share the device, and both systems may use the same default password. Thus, the device may be accessed from hosts of any system using the same password. The first host assumes (since it has not released control) that there is no other host issuing commands causing media motion in the interim. As an example, the first host may fill much of the tape during an archiving process and wait for additional data, the second host may then do a volume verification to check for the location of a particular tape by rewinding to the beginning of tape (BOT), then the first host continues the archiving process, inadvertently overwriting the previously archived information.

Since a primary usage of tape data storage devices is to archive information, the original information is typically not saved in any form. Thus, if the archive information is overwritten, it is often not retrievable from any other source and is lost forever.

However, prevention of sharing of the devices or a significant reduction of the performance of the hosts or systems sharing the devices are alternatives unacceptable to most users.

Additionally, prior or subsequent to an actual job, multiple hosts must be able to move the tape to read the label without hindrance.

SUMMARY OF THE INVENTION

An object of the present invention is to provide a more assured overwrite protection of shared devices without requiring any host software changes (neither control programs or applications).

Another object of the present invention is to provide the protection without a significant reduction in the performance of the hosts or systems sharing the devices.

Disclosed are a method, system, and computer program product subsystem firmware for protecting data of a shared access data storage system from being overwritten, where the data storage system comprises a device sharing access to at least two communication paths.

The method comprises the steps of:

accepting non-write commands from any of the communication paths;

upon receipt of a write command from one of the communication paths, setting a protection indicator for the device for the one communication path for the device receiving the command;

accepting all commands from the one communication path having the protection indicator; and accepting non-motion commands and rejecting any motion command from any communication path not having the protection indicator. Upon receipt of a command or action that causes media removal from any of the communication paths, the protection indicator is canceled.

In one embodiment of the invention, the step of setting a protection indicator for the addressed device for the one communication path comprises setting a "prime protected attribute" in an attribute table relating the devices to the "prime protected attributes", the "prime protected attribute" identifying the one communication path for the addressed device. The steps of accepting all commands and of accepting and rejecting commands additionally comprise consulting the attribute table to determine the one communication path for the addressed device.

Where the device comprises a tape drive for reading and writing on a data storage tape media, the non-write commands comprise any command other than one which directs the device to write records on the tape media, and the non-motion commands exclude commands which cause the device to reposition the tape media, the excluded commands including commands to write and to read any information on the tape media.

In another aspect of the present invention, certain of the communication paths comprise associated groups. Thus, additionally, all commands are accepted from any communication path in a group associated with the one communication path having the protection indicator. Further, if the one communication path having the protection indicator becomes unavailable, the protection indicator is assigned to another of the communication paths in the associated group. Still further, if one of the communication paths is removed from the associated group, the step of accepting all commands excludes the removed communication path. On the other hand, if another communication path is added to the associated group, the step of accepting all commands includes the added communication path.

In one embodiment of the invention, the groups are each identified by means of a "path group identifier" in a path group table, and the step of the device accepting all commands from any communication path in an associated group additionally comprises consulting the path group table to identify the associated group.

The protection permits normal initialization activities of attached hosts to occur without impediment, but blocks actions which could result in unintentional data overwrites (and data loss) in shared environments.

For a fuller understanding of the present invention, reference should be made to the following detailed description taken in conjunction with the accompanying drawings.

BRIEF DESCRIPTION OF THE DRAWINGS

FIG. 1 is a block diagram representation of shared access data storage system and attached network implementing an embodiment of the present invention;

FIG. 3 is a diagrammatic representation of an embodiment of an attribute table which is employed in the method of FIG. 2;

FIG. 4 is a diagrammatic representation of an embodiment of path group table which is employed in the method of FIG. 2;

DETAILED DESCRIPTION OF THE INVENTION

Figure 2:
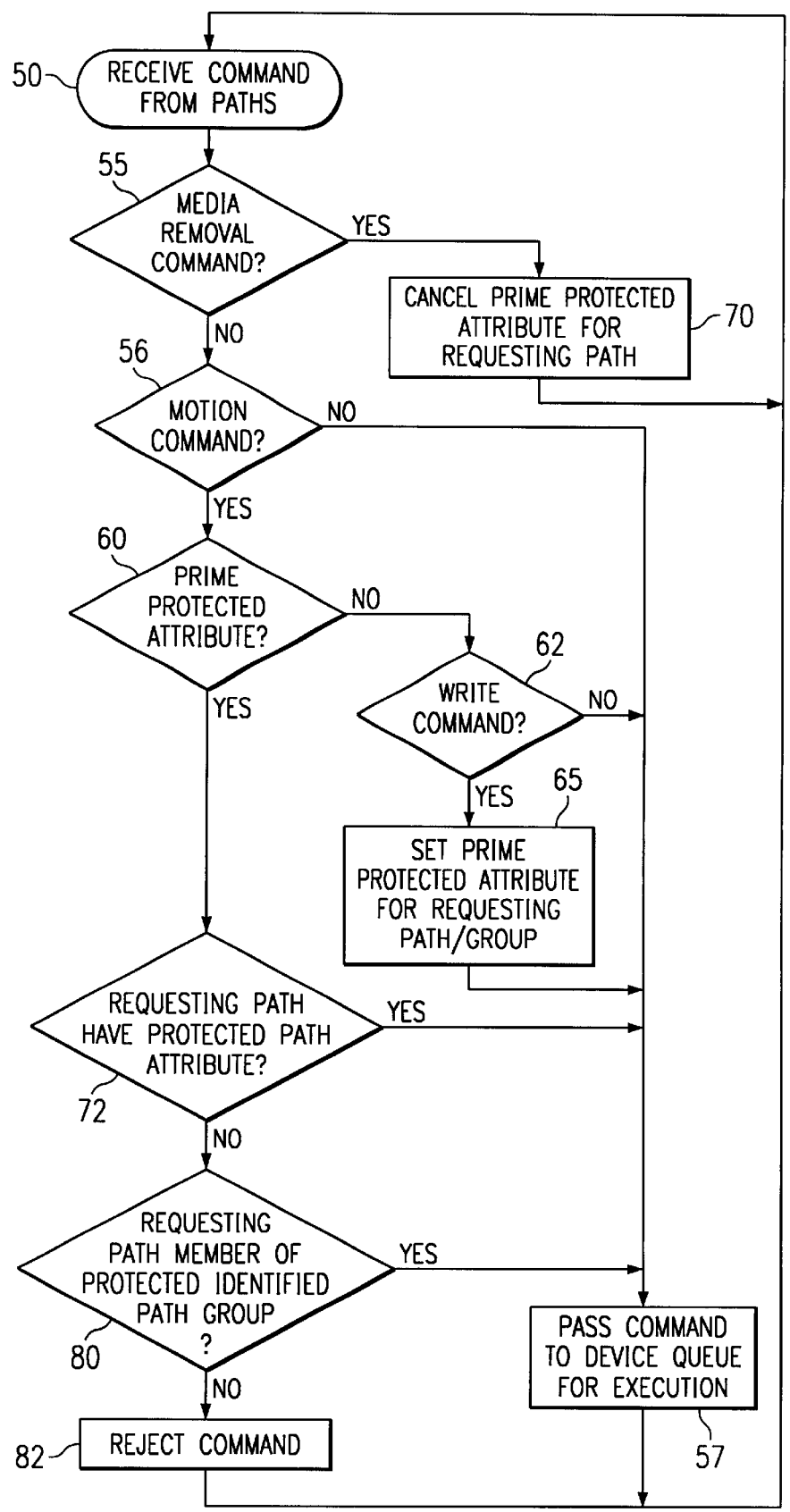
FIG. 2 is a flow chart depicting an embodiment of the present invention for operating the shared access data storage system of FIG. 1.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Referring to FIG. 1, an exemplary shared access data storage system and attached network are illustrated having a data storage controller 10 coupled to devices 11–13 and to hosts 15–19. The controller 10 may comprise any suitable controller, such as a controller for a mass data storage library. In such a case, devices 11–13 typically comprise data storage devices in the library for reading and/or writing data on data storage removable media stored in shelves in the library. An example of a mass data storage library having a library controller 10 which may implement the present invention is the IBM 3494 Tape Library Dataserver. The incorporated devices of the library may therefore be magnetic tape devices of the IBM 3490 or 3590 architecture.

The library controller 10 comprises at least one computer processor 25, and is coupled to an input/output station 27 which may comprise a station for reading a data storage media, such as a floppy disk, and may comprise part of a terminal. The computer processor may comprise for example, an IBM RS/6000 processor. The function of the library controller may be embodied in two separate processors which are interconnected.

The library controller processor 25 has a library database 28 which includes storage (typically one or more hard disk drives) for programs and tables, including a table which relates the physical volumes (media) to the storage shelves, for instructing the library to retrieve a selected media from a storage shelf. The host systems provide commands to the library controller 10 to retrieve selected volumes, and the library controller queries the database to determine the physical volumes of media and the storage shelves in which the media are stored, and causes the library to access the selected media and deliver the volumes to selected ones of the drives 11–13.

Programs for supplying the subsystem microcide, or firmware, such as computer readable program code of a computer program product(s) may be supplied at the I/O station 27 from a storage media 29 which stores executable computer instructions. The illustrated example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from a network or one of the hosts 15–19 at a communications interface.

Typically, the removable media is loaded and verified by moving the media to read the volume identifier before being accessed by a host job or application code, stopping the media at the conclusion of the verification at the end of the BOT (Beginning of Tape) to await commands from the host. Then, the tape is moved to the desired record by the host, and the desired record is read and/or written. The assumption is typically made that since the device stops at the end of a record, the media remains at the stopped location at the time the next sequential command is received at the device. This assumption is correct if the device is coupled to a single host, or to a single host at a time. Thus, in every instance, a single host is aware of the location of the data storage media in the drive. As discussed above, a static device configuration process is employed for every control program for each I/O subsystem. The configuration process defines what devices are associated with specific I/O channels or communication paths. These devices are assigned at I/O configuration generation or hardware configuration definition, and may not all be present at any one time. For example, a device may be temporarily off-line for updating or servicing.

In a dynamic data processing environment where the need for removable media storage devices may fluctuate over time, a device would not be permanently assigned to any one host or its communication path since to do so would detract from the system performance characteristics, for example, by leaving one device idle when not needed by one host, while another host is using its available device and requires the use of another.

The hosts are typically coupled to the library controller 10 over one or more communication paths. The communication paths may be direct connections, or may be indirect, such as by LAN.

Typically, any one of the devices 11–13 may be coupled by the library controller 10, through device interfaces 30, to any host 15–19 over any of its communication paths to facilitate system performance by allowing any idle or available drive to have the media loaded as quickly as possible without waiting for processing of another media to be completed and the media unloaded. Thus, the typical I/O configuration couples each host to as many of the data storage devices as possible, sharing the device between the hosts.

As discussed above, should a device controller complete a write command for one host, and subsequently complete a motion command from another host (such as to read the volume identifier), the first host is unaware of the movement of the media and may simply begin another write operation without first moving the media back to the previous, and assumed, location. The first host is likely to thus overwrite any data at the actual location of the media, and the specific data that was overwritten is at a location unknown to the host and therefore the data that was overwritten is also unknown, and may be irretrievable, even absolutely in case the source is lost.

Thus, dynamic device partitioning protocols attempt to assure that only one host can move the media at one time, thereby providing a one-host-at-a-time environment. As discussed above, in systems of the IBM System 390 type, the host/device assignment mechanism is called "VARY ONLINE". The protection against override may use the "ASSIGN" and "UNASSIGN" process for IBM System 390 interfaces, and for SCSI interfaces, "RESERVE and RELEASE". In one example (Job Entry Subsystem 2), the protection is managed through the assign process at the hardware level, requiring operator host console intervention. In another example (JES 3 or MULTI-IMAGE MANAGER of COMPUTER ASSOCIATES), the protection is at the software level through coordination between the hosts. The hosts of any one grouping communicate with each other via a shared disk or other common link, and control the "VARY" process, in JES 2 using a simple time shared "VARY", and in JES 3 or MIM using a shared "VARY". These processes avoid the high cost and slow operating speed of monitoring a shared drive. It does, however, pose the risk that operator, hardware, or software errors can result in an inadvertent overwrite.

The embodiment of FIG. 1 illustrates several examples of hosts and various communication paths. Host 15 is illustrated as having two communication paths 35 coupled to interface 36 for communicating with the devices 11–13. Employing a conventional VARY process, host 15 may either control one device 11–13 over both communication paths 35, or simultaneously control two or more devices over the two communication paths. Host 16 is illustrated as having three communication paths 37 coupled to interface 38 for communicating with the devices 11–13. With a conventional VARY process, host 16 may also control one device 11–13 over all three communication paths 37, or simultaneously control two or three devices over any subset of the communication paths. Hosts 16 and 15 will have to communicate with each other in accordance with the conventional protocol to insure that both hosts are not controlling the same device 11–13.

Hosts 17 and 18 are illustrated as coupled to interface 39 over the same path 40, which comprises a shared path, such as a LAN or bus bridge, having specific paths 41 to host 17 and path 42 to host 18. Host 19 is illustrated as coupled to interface 43 over a shared path 46 having a specific path 47.

The illustrated communication paths are exemplary only, and any combination of paths, using any acceptable architectures may be employed. Although the interfaces 36, 38, 39 and 43 are illustrated as independent, they may comprise one or more combined interfaces of the same type, such as SCSI, ESCON, etc., as are known to those of skill in the art.

In accordance with the present invention, an overwrite protection facility operates the processor 25 independently of the hosts to automatically protect a device 11–13 upon the occurrence of a write command for the device. The protection allows only the communication path issuing the first write command, and communication paths in the same group as the issuing communication path, to issue commands resulting in movement of the media on the device. Commands not resulting in movement of the media are allowed from any communication path. The protection continues until specifically released by a "MEDIA REMOVAL" command. The protection, in one embodiment, is by means of a prime protected attribute for the device-communication path pair.

An embodiment of the method of the present invention is illustrated with reference to FIG. 2. In step 50, the controller 10 of FIG. 1 receives a command for one of the devices 11–13 from one of the communication paths 35, 37, 40 or 46. As an example, the device may comprise "DEVICE A" 11.

In step 55, the processor 25 determines whether the received command is a "MEDIA REMOVAL" command or action for the identified device 11. An example of a media removal command is an "UNLOAD" command. Action examples are a manual unload, or a library-caused unload.

For the purpose of the present invention, all are defined as "MEDIA REMOVAL" commands, whether or not the media is actually removed. If not, "NO", step 56 determines whether the command is a "MOTION" command. "MOTION" commands may include, for example, commands to write, to read, to rewind, to write a tape mark, to conduct a volume verification (requiring a rewind to the BOT and read), and to conduct a locate to a specific record or file or tape. Commands that are not "MOTION" commands include various drive sense commands which allow a host to determine the status of a drive.

If step 56 determines that the command is not a "MOTION" command, "NO", the processor 25 passes the command to the device queue in step 57 for execution by the device 11. Non-motion steps are allowed by commands on any communication path whether or not a device is protected because there is no danger of an overwrite condition.

If, however, step 56 determines that the command is a "MOTION" command, a further determination is made, in step 60, whether the addressed device 11 is protected, in the example, by a "PRIME PROTECTED ATTRIBUTE" designation. The processor 25 makes this determination by examining the table 61 in FIG. 3. For the moment, it will be assumed that the table indicates a "null" or "binary zero" for the addressed device. This is also called an "empty" indication for the addressed device. Thus, the determination by step 60 is "NO", there is no "PRIME PROTECTED ATTRIBUTE" for the addressed device.

Step 62 determines whether the received "MOTION" command is a "WRITE" command. If the command is not a "WRITE" command, "NO", the processor 25 passes the command to the device queue in step 57 for execution by the device 11. In accordance with the present invention, motion steps other than a "WRITE" are allowed by commands on any communication path only if the device is not protected because there is no danger of an unintended overwrite.

In accordance with the present invention, upon step 62 indicating that the command is a "WRITE", step 65 sets the "PRIME PROTECTED ATTRIBUTE" for the requesting path. For example, the processor 25 accesses table 61 of FIG. 3 for the addressed device as identified in column 66, for example, device "A" and sets the "PRIME PROTECTED ATTRIBUTE" in column 67, identifying the requesting path with the path I.D., for example, path "2", representing one of the communication paths 35 from host 15 in FIG. 1. This transitions the device-communication pair to a protected state, which protects the addressed device against motion originating with any communication path other than the originating path, or any communication path in the same group as the originating path, as will be explained. The protection is thus established without any direct action from the host other than originating the "WRITE" command.

Once the protection has been established, the "WRITE" command is passed to the device queue in step 57 for execution by the device 11.

Upon passing the last command to the device queue, the method cycles back to step 50 to receive the next command.

If step 55 determines that a command is a "MEDIA REMOVAL" command or action for the addressed device, step 70 cancels the "PRIME PROTECTED ATTRIBUTE" for the device. Thus, the processor 25 resets the "PRIME PROTECTED ATTRIBUTE" in column 67 of table 61 for the addressed device to a "null" or "empty". This terminates the protection for the addressed device. In a preferred embodiment of the present invention, the "MEDIA REMOVAL" command may be received from any communication path. This is permitted to allow recovery of a device in the case of the failure of the system with the protected path. There is no exposure since the "MEDIA REMOVAL" function always results in media unload. Thus, should the originating communication path be disabled, and all other paths of the group disabled (for example, if the originating host goes off-line), an operator may go to another host or communication path to free the device.

Assuming that the device 11 is still protected, and a "MOTION" command is detected in step 56 for the protected device, in step 60, the processor 25 queries the table 61 in FIG. 3 for the device "A". If the entry for the device is non-empty, that is, if the entry is other than a "null", the device is protected by a "PRIME PROTECTED ATTRIBUTE", "YES", and, in step 72, the processor 25 compares the I.D. of the requesting communication path to the I.D. in column 67 of table 61. If they are the same, "YES", the communication path that has originated the "WRITE" and that thereby gained the overwrite protection, is the communication path now further commanding operation of the device, which is fully permissible. In the example, this is designated path "2". Thus, the command is passed to the device queue in step 57 for execution by the device 11.

If the comparison of the requesting communication path I.D. to the I.D. of column 67 in step 72 indicates that a communication path other than the protected path is commanding motion of the media, that command is subject to rejection if not a member of a common group, as will be explained.

Figure 5:
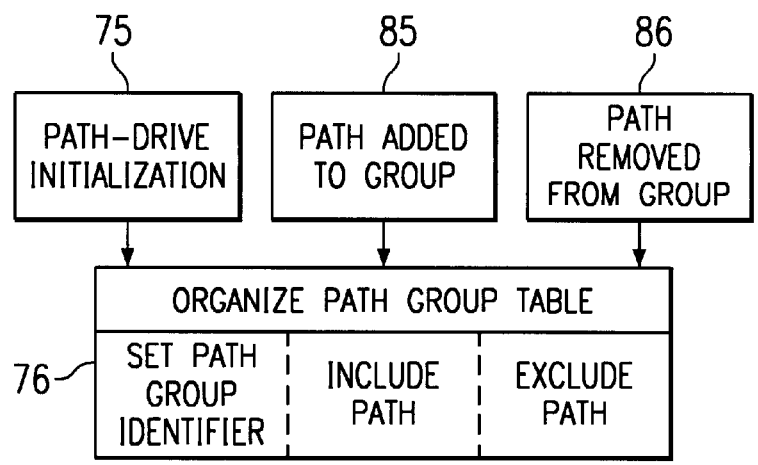
FIG. 5 is a flow chart depicting an embodiment of a method of the present invention for establishing and maintaining the path group table of FIG. 4.

Referring to FIGS. 4 and 5, step 75 represents path-drive initialization. In one embodiment, the paths are defined at controller IML or host IPL, and the group assignments are made during a dynamic partitioning "VARY ONLINE". The dynamic partitioning may be redone occasionally or may redone each time that a data storage media is loaded into a drive. Specifically, a host, or a plurality of hosts working together on a job, may designate that several of the communication paths to a device are members of a common group. This means that it is acceptable for commands to appear on any member of the group of communication paths that will move the media. It is presumed that the host or hosts will only overwrite the media when they desire to do so. Writes from non protected paths are by default permitted due to implementation performance issues. They may be optionally excluded. Protection results since virtually no job starts without an initial rewind with possible label reads— which result in abending the offending job. Coordinated multi-host writes as part of a common job are exceedingly rare.

Thus, as the result of the path-drive initialization of step 75, the processor 25 of FIG. 1 will, in step 76, organize a path group table 77 of FIG. 4. In the example of FIG. 1, path group table 77 will list each of the path I.D.s for the paths 35, 37, 41, 42 and 47 in column 78 and will identify the associated groups, if any, in column 79. In the example, communication paths with the I.D.s "1" and "2" from host 15 and the communication path with the I.D. "3" from host 16, are all identified as members of group "G1".

As members of a common group, any transition of the device to a protected state for one of the communication paths of the group, results in the protection extending to include all other communication paths of the group as able to issue a command which will result in movement of the media. Referring additionally to FIG. 2, upon step 60 indicating that there is a "PRIME PROTECTED ATTRIBUTE" for the device, and upon step 72 indicating that the communication path requesting the motion is not the path assigned the "PRIME PROTECTED ATTRIBUTE" from table 61 of FIG. 3, in step 80, the processor 25 additionally queries table 77 to determine if the requesting communication path is a member of a common group with the communication path having the assigned "PRIME PROTECTED ATTRIBUTE" I.D. If not, "NO", the command is rejected in step 82, and the process cycles back to step 50 for the next command.

If the group I.D. in column 79 of table 77 indicates that it is in the same group as the protected communication path, "YES", in step 80, step 57 forwards the command to the queue for the device.

Thus, "MOTION" commands from communication paths that are either defined in the attribute table 61 as having a protection indicator, or defined in the path group table 77 as being in the same group as the path having the protection indicator, are passed to the device queue for execution, and "MOTION" commands from any other communication paths are rejected.

Referring again to FIG. 5, in other embodiments of the present invention, communication paths may be either added, step 85, or removed, step 86, from the group. This may occur after the "VARY ONLINE" process of step 75 in that step 76 only places communication paths which are available into the listed groups. Thus, a communication path which had been included in the "VARY ONLINE", but which was not available, now becomes available in step 85, or alternatively, was available and now becomes unavailable in step 86. A communication path may be broken by means of a) a physical link break or unplug; b) a logical link break, e.g., host physical path reset or host logical path establish/disestablish, or c) device internal recognition of a resetting event. Thus, when a path is added to a group in step 85, the processor 25, in step 76, updates the group path table 77 in FIG. 4 to include the added communication path, and when a path is removed from a group in step 86, the processor updates the group path table 77 to exclude the path. As the result, step 80 in FIG. 2 queries a correctly updated group path table 77, for forwarding or rejecting a command.

Figure 6:
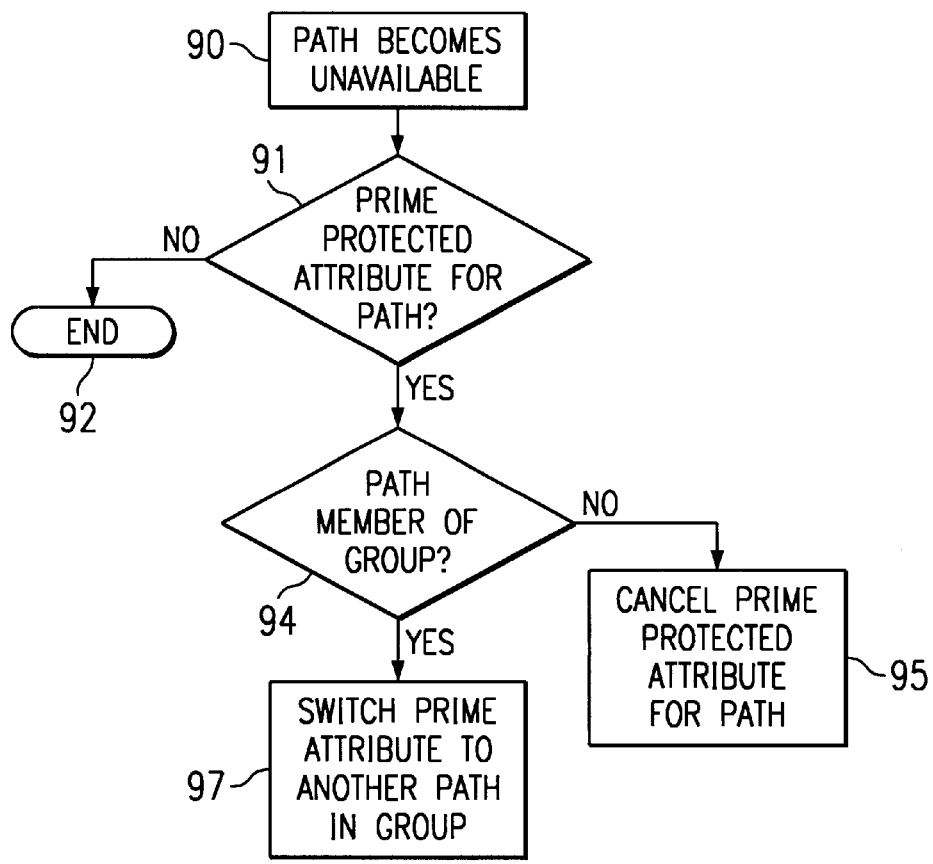
FIG. 6 is a flow chart depicting an embodiment of a method of the present invention for updating the attribute table of FIG. 3 and the path group table of FIG. 4 upon a path of the data storage system of FIG. 1 becoming unavailable.

FIG. 6 illustrates an embodiment of the present invention for handling device "PROTECTED PATH ATTRIBUTE's" when a communication path becomes unavailable. The controller 10 may discover that a path has been broken and is unavailable when attempting to send information over the communication path and the controller receives a "RESET" signal, in step 90. In step 91, the processor 25 queries the attribute table 61 of FIG. 3 to determine whether the communication path has a "PRIME PROTECTED ATTRIBUTE" for the device. The processor will query all of the attribute tables for the various devices 11–13 until it is determined that there is a "PRIME PROTECTED ATTRIBUTE" for the communication path, or that there is none. If there is none, the process ends at step 92.

If, however, step 91 determines that there is a "PRIME PROTECTED ATTRIBUTE" for the communication path for the device, "YES", step 94 queries the appropriate group path table 77 of FIG. 4. The query determines whether the communication path is the member of a group. If not, "NO", the path is not a member of a group, and, in order to make the device available, rather than to hang until the broken communication path is ultimately brought back on line, step 95 cancels the "PRIME PROTECTED ATTRIBUTE" for the device for the communication path. Step 95 may be accompanied by appropriate warnings to the operator, etc., to remove the media so that it is not subject to being overwritten.

Alternatively, the operator may access the device by means of another communication path, not necessarily one of the protected group, and issue a "MEDIA REMOVAL" command for the device. In FIG. 2, the controller 10, at step 55 will recognize the command and cancel the "PRIME PROTECTED ATTRIBUTE" for the device.

If step 94 determines that the broken communication path is a member of a group, "YES", step 97 switches the I.D. of the attribute table from the broken communication path I.D. to the I.D. of another communication path in the group, so the attribute is reassigned. Any suitable algorithm may be employed to make the specific selection of the alternate communication path. Additionally, should all communication paths of a group be disrupted, e.g., "resets" received on all paths, step 97 of FIG. 6 will switch to step 95 and cancel the "PRIME PROTECTED ATTRIBUTE" for the path of the group listed in the attribute table 61 of FIG. 3.

As an alternative embodiment, the group I.D.s of column 79 of the path group table 77 in FIG. 4 are employed directly as the path I.D.s in column 67 of table 61 in FIG. 3.

The updating processes of FIGS. 5 and 6 allow the method of FIG. 2 to both protect the media on the devices from being overwritten, and to avoid being hung up due to changes in the environment of the communication paths, without requiring active intervention by any of the hosts 15–19 of FIG. 1.

The preferred embodiment of the method of FIGS. 2, 5 and 6 is a program, such as computer readable program code of a computer program product, which may be supplied at the I/O station 27 in FIG. 1 from a storage media 29 which stores executable computer instructions, and stored in the library database 28 for operating the library controller processor 25.

The attribute table 61 of FIG. 3 is, in accordance with the present invention, reset to "ZERO" or "NULL" for a device upon a manual unload of the device, or upon a rewind/unload command.

Those of skill in the art may envision that the present invention may be implemented in protocols other than the specific protocols discussed herein. This also admits of heterogeneous sharing with protection with both S/S90 and open system SCSI hosts.

Where the device comprises a tape drive for reading and writing on a data storage tape media, the non-write commands comprise any command other than one which directs the device to write data records or control records (e.g., filemarks) on the tape media, and the non-motion commands exclude commands which direct the device to reposition the tape media, the excluded commands including commands to write and to read any information on the tape media.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for protecting data of a shared access data storage system, said system comprising a non-self-orienting data storage device sharing access to at least two communication paths, said non-self-orienting data storage device responding to motion commands comprising at least write and read commands, and to non-motion commands, comprising the steps of:

accepting non-write commands of said motion and non-motion commands from any of said communication paths;

upon receipt of a said write command from one of said communication paths, setting a protection indicator for said device for said one communication path;

accepting all said commands from said one communication path having said protection indicator; and accepting said non-motion commands and rejecting any said motion command from any said communication path not having said protection indicator.

2. The method of claim 1, additionally comprising the step of, upon receipt of a "MEDIA REMOVAL" command, canceling said protection indicator.

3. The method of claim 1, wherein certain of said communication paths comprise associated groups, and wherein said step of accepting all said commands additionally accepts all said commands from any said communication path in an associated group with said one communication path having said protection indicator.

4. The method of claim 3, comprising the additional step of responding to said one communication path becoming unavailable, said one communication path having said protection indicator, said additional step assigning said protection indicator to another of said communication paths in said associated group.

5. The method of claim 3, wherein one of said communication paths is removed from said associated group, and wherein said step of accepting all said commands excludes said removed communication path.

6. The method of claim 3, wherein another communication path is added to said associated group, and wherein said step of accepting all said commands includes said added communication path.

7. The method of claim 3, wherein said groups are each identified by means of a "path group identifier" in a path group table, and wherein said step of accepting all said commands from any said communication path in an associated group additionally comprises consulting said path group table to identify said associated group.

8. The method of claim 1, wherein said storage system comprises a plurality of said non-self-orienting data storage devices and said plurality of communication paths, wherein said received write command from said one communication path addresses one of said non-self-orienting data storage devices, and wherein said step of setting a protection indicator comprises setting said indicator for said addressed device for said one communication path.

9. The method of claim 8, wherein said step of setting a protection indicator for said addressed non-self-orienting data storage device for said one communication path comprises setting a "prime protected attribute" in an attribute table relating said non-self-orienting data storage devices to said "prime protected attributes", said "prime protected attribute" identifying said one communication path for said addressed non-self-orienting data storage device, and wherein said steps of accepting all said commands and of accepting and rejecting said commands additionally comprise the steps of consulting said attribute table to determine said one communication path for said addressed non-self-orienting data storage device.

10. The method of claim 1, wherein said non-self-orienting data storage device comprises a tape drive for reading and writing on a data storage tape media, wherein said non-write commands comprise any command other than one which directs said non-self-orienting data storage device to write data records on said data storage tape media, and wherein said non-motion commands exclude commands which direct said non-self-orienting data storage device to reposition said data storage tape media, said excluded commands including commands to write and to read any information on said data storage tape media.

11. A data storage system for sharing access to at least two communication paths and for protecting shared access data, comprising:

at least one non-self-orienting data storage device, said non-self-orienting data storage device responding to motion commands comprising at least write and read commands, and to non-motion commands; and a controller coupled to said communication paths and to said non-self-orienting data storage device; said controller accepting non-write commands of said motion and non-motion commands from any of said communication paths for said non-self-orienting data storage device; upon receipt of a said write command from one of said communication paths for said non-self-orienting data storage device, setting a protection indicator for said non-self-orienting data storage device for said one communication path; accepting all said commands for said non-self-orienting data storage device from said one communication path having said protection indicator; and accepting said non-motion commands and rejecting any said motion command for said non-self-orienting data storage device from any said communication path not having said protection indicator.

12. The data storage system of claim 11, wherein said controller additionally, upon receipt of a "MEDIA REMOVAL" command for said non-self-orienting data storage device, cancels said protection indicator.

13. The data storage system of claim 11, wherein certain of said communication paths comprise associated groups, and wherein said controller, when accepting all said commands for said non-self-orienting data storage device from said one communication path, additionally accepts all said commands from any said communication path in an associated group with said one communication path having said protection indicator.

14. The data storage system of claim 13, wherein said controller additionally responds to said one communication path becoming unavailable, said one communication path having said protection indicator, said controller assigning said protection indicator to another of said communication paths in said associated group.

15. The data storage system of claim 13, wherein one of said communication paths is removed from said associated group, and wherein said controller, when accepting all said commands for said non-self-orienting data storage device from any said communication path in said associated group, excludes said removed communication path.

16. The data storage system of claim 13, wherein another communication path is added to said associated group, and wherein said controller, when accepting all said commands for said non-self-orienting data storage device from any said communication path in said associated group, includes said added communication path.

17. The data storage system of claim 13, wherein said controller additionally comprises a path group table; wherein said controller identifies each said associated group by means of a "path group identifier" in said path group table; and wherein said controller, when accepting all said commands for said non-self-orienting data storage device from any said communication path in an associated group, additionally consults said path group table to identify said associated group.

18. The data storage system of claim 11, wherein said storage system comprises a plurality of said non-self-orienting data storage devices; wherein said received write command from said one communication path addresses one of said non-self-orienting data storage devices, and wherein said controller, when setting a protection indicator, sets said protection indicator for said addressed non-self-orienting data storage device for said one communication path.

19. The data storage system of claim 18, wherein said controller additionally comprises an attribute table relating each said non-self-orienting data storage device to a "prime protected attribute" or to a null, said "prime protected attribute" identifying said one communication path for said addressed non-self-orienting data storage device; wherein said controller, when setting a protection indicator for said addressed non-self-orienting data storage device for said one communication path, sets said "prime protected attribute" in said attribute table for said non-self-orienting data storage device; and wherein said controller, when accepting all said commands and when accepting and rejecting said commands, additionally consults said attribute table "prime protected attributes" to determine said one communication path for said addressed non-self-orienting data storage device.

20. The data storage system of claim 11, wherein said non-self-orienting data storage device comprises a tape drive for reading and writing on a data storage tape media; wherein said non-write commands comprise any command other than one which directs said tape drive to write data records on said data storage tape media; and wherein said non-motion commands exclude commands which direct said tape drive to reposition said data storage tape media, said excluded commands including commands to write and to read any information on said data storage tape media.

21. A computer program product usable with a programmable computer processor having computer readable program code embodied therein for protecting data of a shared access data storage system, said system comprising a non-self-orienting data storage device sharing access to at least two communication paths, said non-self-orienting data storage device responding to motion commands comprising at least write and read commands, and to non-motion commands, comprising:
  computer readable program code which causes said programmable computer processor to accept non-write said commands from any of said communication paths;
  computer readable program code which causes said programmable computer processor to, upon receipt of a said write command from one of said communication paths, set a protection indicator for said non-self-orienting data storage device for said one communication path;
  computer readable program code which causes said programmable computer processor to accept all said commands from said one communication path having said protection indicator; and
  computer readable program code which causes said programmable computer processor to accept said non-motion commands and reject any said motion command from any said communication path not having said protection indicator.

22. The computer program product of claim 21, additionally comprising computer readable program code which causes said programmable computer processor to, upon receipt of a "MEDIA REMOVAL" command, cancel said protection indicator.

23. The computer program product of claim 21, wherein certain of said communication paths comprise associated groups, and wherein said computer readable program code which causes said programmable computer processor to accept all said commands, additionally to accept all said commands from any said communication path in an associated group with said one communication path having said protection indicator.

24. The computer program product of claim 23, additionally comprising computer readable program code which causes said programmable computer processor to, in response to said one communication path becoming unavailable, said one communication path having said protection indicator, assign said protection indicator to another of said communication paths in said associated group.

25. The computer program product of claim 23, wherein one of said communication paths is removed from said associated group, and wherein said computer readable program code which causes said programmable computer processor to accept all said commands, to exclude said removed communication path.

26. The computer program product of claim 23, wherein another communication path is added to said associated group, and wherein said computer readable program code which causes said programmable computer processor to accept all said commands includes said added communication path.

27. The computer program product of claim 23, wherein said computer readable program code additionally comprises a path group table, wherein groups are each identified by means of a "path group identifier" in said path group table, and wherein said computer readable program code which causes said programmable computer processor to accept all said commands from any said communication path in an associated group, additionally comprises computer readable program code which causes said programmable computer processor to consult said path group table to identify said associated group.

28. The computer program product of claim 21, wherein said storage system comprises a plurality of said non-self-orienting data storage devices and said plurality of communication paths, wherein said received write command from said one communication path addresses one of said non-self-orienting data storage devices, and wherein said computer readable program code which causes said programmable computer processor to set a protection indicator comprises setting said indicator for said addressed non-self-orienting data storage device for said one communication path.

29. The computer program product of claim 28, wherein said computer readable program code additionally comprises an attribute table relating said non-self-orienting data storage devices to said "prime protected attributes", said "prime protected attribute" identifying said one communication path for said addressed non-self-orienting data storage device, wherein said computer readable program code which causes said programmable computer processor to set a protection indicator for said addressed non-self-orienting data storage device for said one communication path comprises setting said "prime protected attribute" in said attribute table, and wherein said computer readable program code which causes said programmable computer processor to accept all said commands and to accept and reject said commands, additionally comprise consulting said attribute table to determine said one communication path for said addressed non-self-orienting data storage device.

30. The computer program product of claim 21, wherein said non-self-orienting data storage device comprises a tape drive for reading and writing on a data storage tape media, wherein said non-write commands comprise any command other than one which directs said tape drive to write data records on said data storage tape media, and wherein said non-motion commands exclude commands which direct said tape drive to reposition said tape media, said excluded commands including said commands to write and to read any information on said data storage tape media.

* * * * *